United States Patent
McGrath et al.

(10) Patent No.: US 8,850,432 B2
(45) Date of Patent: Sep. 30, 2014

(54) CONTROLLING UTILIZATION IN A MULTI-TENANT PLATFORM-AS-A-SERVICE (PAAS) ENVIRONMENT IN A CLOUD COMPUTING SYSTEM

(75) Inventors: Michael P. McGrath, Schaumburg, IL (US); Matthew Hicks, Westford, MA (US); Thomas Wiest, Lehi, UT (US); Daniel C. McPherson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 291 days.

(21) Appl. No.: 13/483,861

(22) Filed: May 30, 2012

(65) Prior Publication Data
US 2013/0326507 A1 Dec. 5, 2013

(51) Int. Cl.
*G06F 9/455* (2006.01)
(52) U.S. Cl.
USPC .............................................. 718/1
(58) Field of Classification Search
None
See application file for complete search history.

(56) References Cited

U.S. PATENT DOCUMENTS

| 2011/0239215 A1* | 9/2011 | Sugai | 718/1 |
| 2011/0258621 A1* | 10/2011 | Kern | 718/1 |
| 2012/0297380 A1* | 11/2012 | Colbert et al. | 718/1 |

* cited by examiner

Primary Examiner — Emerson Puente
Assistant Examiner — Sisley Kim
(74) Attorney, Agent, or Firm — Lowenstein Sandler LLP

(57) ABSTRACT

A mechanism for controlling utilization in a multi-tenant Platform-as-a-Service (PaaS) environment in a cloud computing system is disclosed. A method includes obtaining, by a resource control module executing on a computing device, an active capacity metric of each virtual machine (VM) of a plurality of VMs in a district of a multi-tenant PaaS system, the active capacity metric comprising a result of dividing a number of containers that are currently executing in the VM by a maximum number of active containers allowed to execute in the VM, determining that the active capacity metric of a source VM in the district exceeds an active capacity threshold associated with the source VM, and migrating at least one of the containers of the source VM to a target VM in the district, wherein the target VM is operating with an active capacity metric below the active capacity threshold associated with the target VM.

17 Claims, 7 Drawing Sheets

CONTROLLING UTILIZATION IN A MULTI-TENANT PLATFORM-AS-A-SERVICE (PAAS) ENVIRONMENT IN A CLOUD COMPUTING SYSTEM

CROSS-REFERENCE TO RELATED APPLICATIONS

The present application is related to co-filed U.S. patent application Ser. No. 13/483,800 entitled "Mechanism for Controlling Capacity in a Multi-Tenant Platform-as-a-Service (PaaS) Environment in a Cloud Computing System", which is assigned to the assignee of the present application.

TECHNICAL FIELD

The embodiments of the invention relate generally to platform-as-a-service (PaaS) environments and, more specifically, relate to a mechanism for controlling utilization in a multi-tenant PaaS environment in a cloud computing system.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system. Customers that have installed and are executing their programs "in the cloud" typically communicate with the executing program from remote geographic locations using Internet protocols.

For programs that are web applications, the additional software can further include such software components as middleware and a framework. Web applications are programs that receive and act on requests in web or other Internet protocols, such as HTTP. It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing the facilities required to support the complete life cycle of building and delivering web application and service entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because the applications being deployed in the PaaS are generally quite small packages, and the size of the VM does not correspond to the size of the application. It can be costly to initialize a new VM for each application deployment, and it may also be a waste of resources that are not being utilized. In a public cloud environment, a PaaS provider pays for deploying a VM whether the VM lies idle or not. In a private cloud environment, there is still a strain on resources for running VMs that are not completely utilized.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
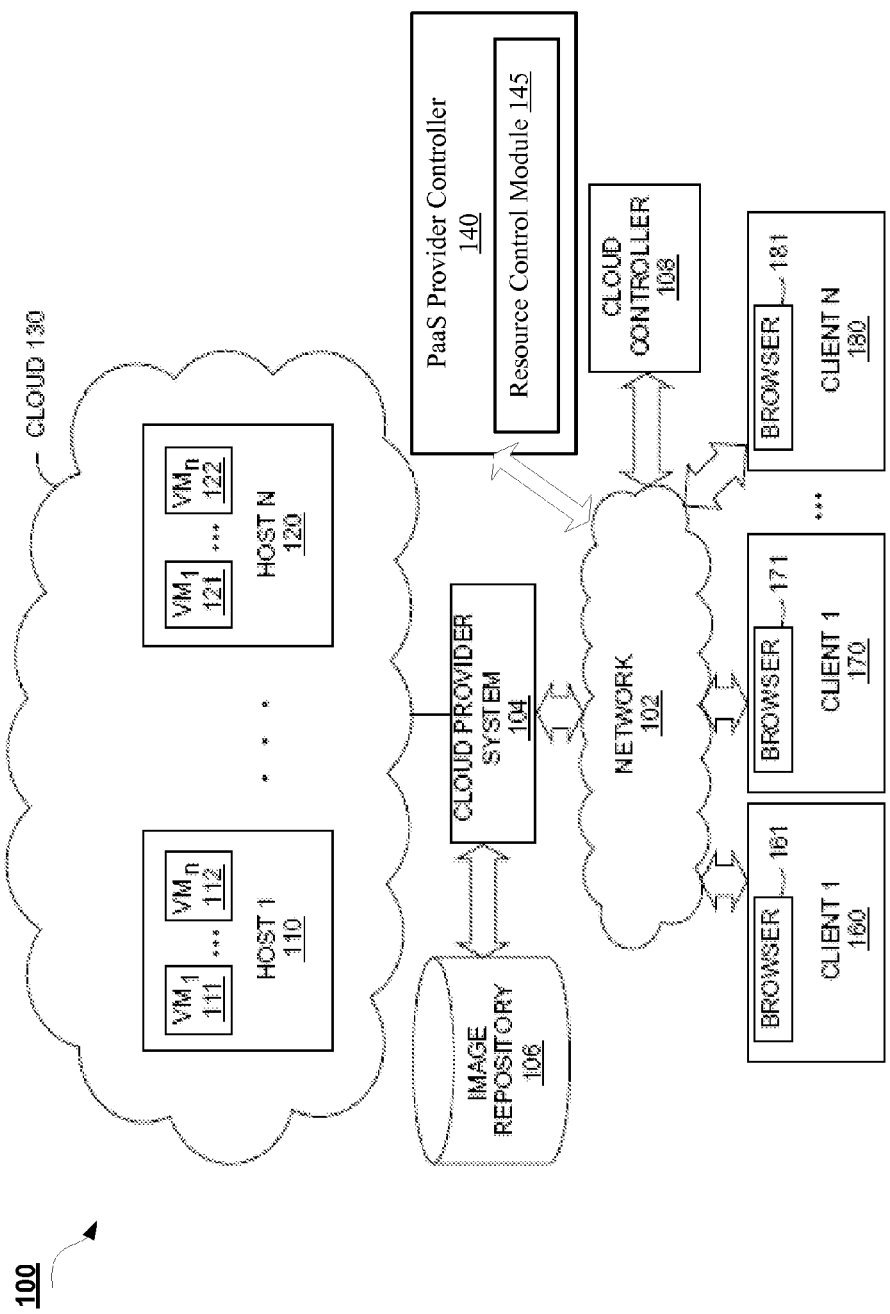
FIG. 1 is a block diagram of a network architecture in which embodiments of the invention may operate.

Embodiments of the invention provide a mechanism for controlling utilization in a multi-tenant Platform-as-a-Service (PaaS) environment in a cloud computing system. A method of embodiments of the invention includes obtaining, by a resource control module executing on a computing device, an active capacity metric of each virtual machine (VM) of a plurality of VMs in a district of a multi-tenant PaaS system, the active capacity metric comprising a result of dividing a number of containers that are currently executing in the VM by a maximum number of active containers allowed to execute in the VM, determining that the active capacity metric of a source VM in the district exceeds an active capacity threshold associated with the source VM, and migrating at least one of the containers of the source VM to a target VM in the district, wherein the target VM is operating with an active capacity metric below the active capacity threshold associated with the target VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", "determining", "pinging", "comparing", "migrating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for controlling utilization in a multi-tenant PaaS environment in a cloud computing system. Embodiments of the invention utilize an active capacity metric for a node in a multi-tenant PaaS system to determine when an application on the node should be migrated to a new node to best address utilization of nodes in the PaaS system. A load balancing agent at the broker layer pulls active capacity metric information from each node and analyzes each node in a district to determine whether active capacity thresholds are being exceeded at the node. If a node has reached its active capacity threshold and there is still active capacity available on other nodes within the district of the node, then the broker migrates the application to a different existing node within the district. By migrating applications between nodes within a district, compatibility of labels and resource usage measures implemented for a district can be easily maintained.

FIG. 1 is a block diagram of a network architecture 100 in which embodiments of the invention may operate. The network architecture 100 includes a cloud 130 managed by a cloud provider system 104. The cloud provider system 104 provides VMs, such as VMs 111, 112, 121, and 122, hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, PaaS provider controller 140 includes a resource control module 145 configured to control utilization of a multi-tenant PaaS system implemented in cloud 130. The resource control module 145 may monitor overall utilization of VMs 111, 112, 121, 122 implementing the multi-tenant PaaS system in order to determine whether execution components of applications executed in the multi-tenant PaaS system should be migrated between VMs 111, 112, 121, 122 implementing the PaaS system. The PaaS provider controller 140 can interact with cloud provider system 104 to cause the migration of components between VMs to control utilization of the PaaS system.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
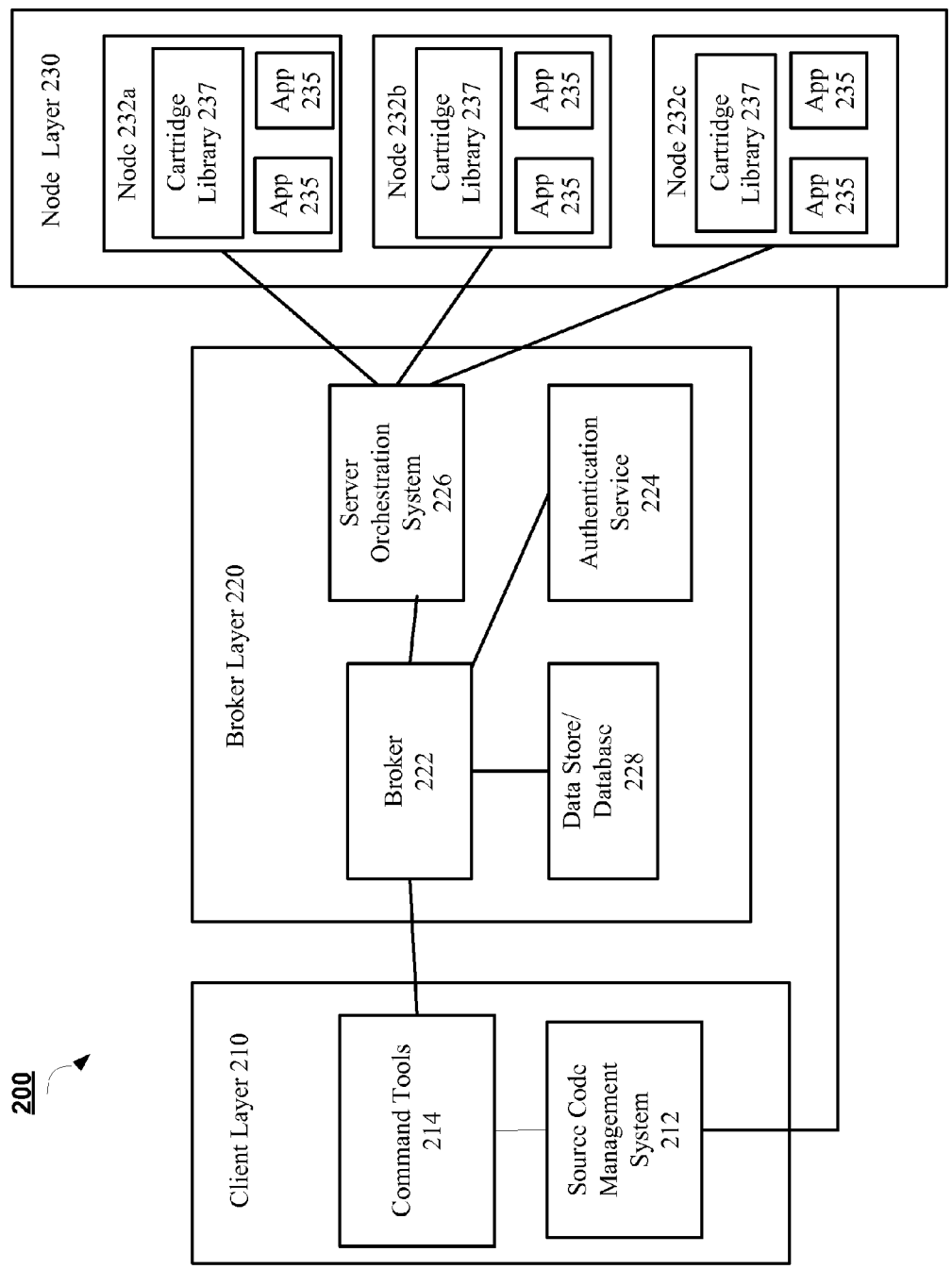
FIG. 2 is a block diagram of a PaaS system architecture according to an embodiment of the invention.

FIG. 2 is a block diagram of a PaaS system architecture 200. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate a separate message to all nodes 232 to shut down all applications 235 if the node 232 is even, and distribute the messages to the nodes 232 using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Storage-as-a-Service (SaaS) storage provider, such as Amazon™ S3™ (Simple Storage Service). The broker 222 uses the information about the nodes 232 and their applications 235 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235 that may be owned or managed by different users and/or organizations. As such, a first customer's deployed applications 235 may co-exist with any other customer's deployed applications on the same node 232 (VM) that is hosting the first customer's deployed applications 235.

In addition, each node also maintains a cartridge library 237. The cartridge library 237 maintains multiple software components (referred to herein as cartridges) that may be utilized by applications 235 deployed on node 232. A cartridge can represent a form of support software providing the functionality needed to run an application 235. In one embodiment, the cartridges are maintained that support languages such as JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, and cron scheduler, for example. Adding an instance of a cartridge from cartridge library 237 to an application 235 provides a capability for the application 235 without the customer owning the application having to administer or update the included feature.

The deployment of multiple applications 235 of multiple customers on a single node 232 (VM) is a cost-efficient solution for PaaS providers. However, deploying a multi-tenant PaaS solution raises a variety of concerns, including, for example, how to efficiently control capacity and utilization of the nodes 232 in the PaaS system. Embodiments of the invention provide a mechanism to add nodes in a multi-tenant PaaS system when capacity limits are reached. One embodiment of the interaction between the server orchestration system 226 and a node 232 to implement adding nodes for resource control in a multi-tenant PaaS system is now described in more detail with reference to FIG. 3.

Figure 3:
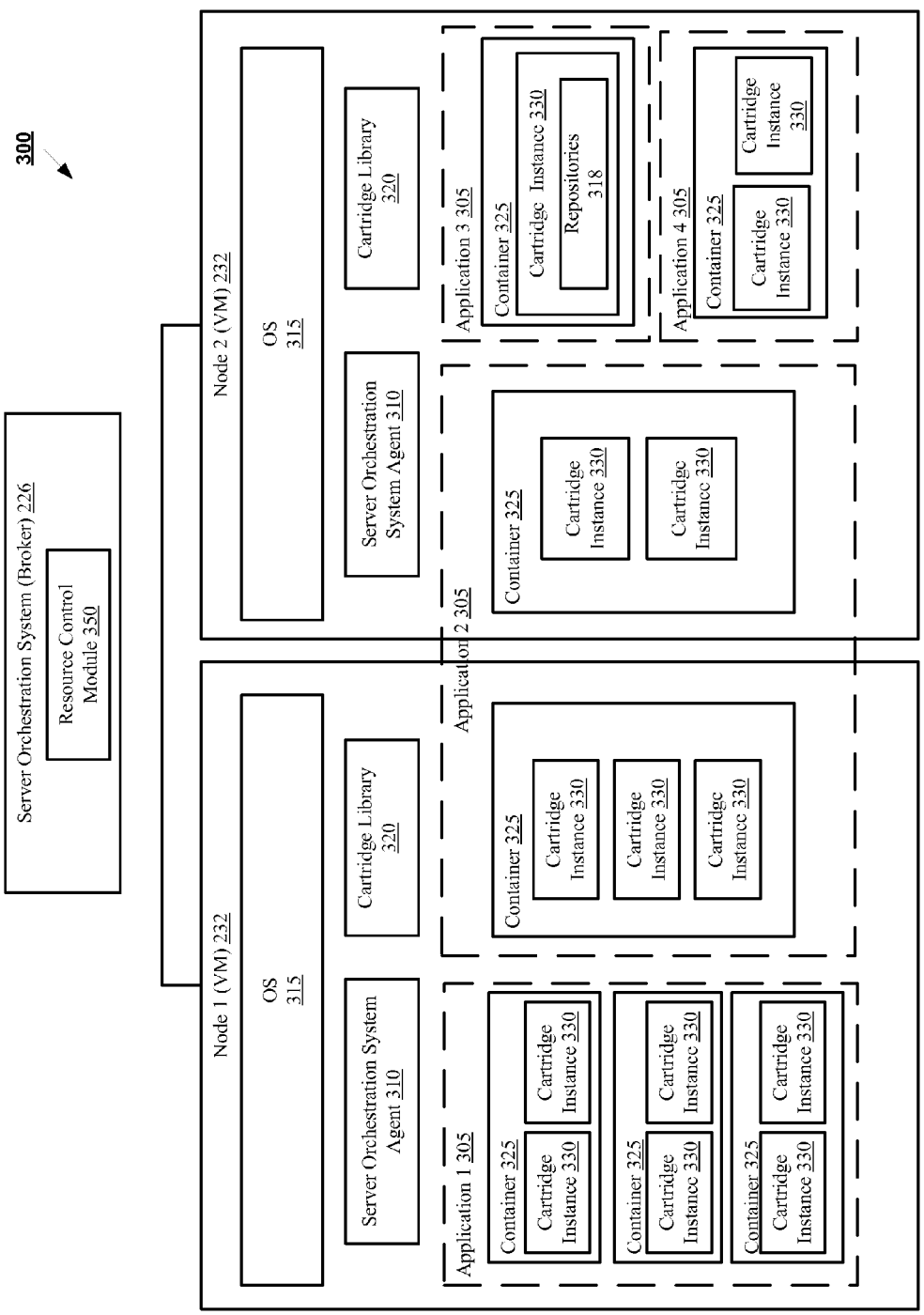
FIG. 3 is a block diagram of a communication infrastructure between a server orchestration system and a node according to embodiments of the invention.

FIG. 3 is a block diagram depicting a communication infrastructure 300 between a server orchestration system 226 and a plurality of nodes 232 according to embodiments of the invention. In one embodiment, server orchestration system 226 and nodes 232 are the same as their counterparts described with respect to FIG. 2. In one embodiment, each node 232 is implemented as a VM and has an operating system 315 that can execute applications 305 using the cartridge library 320 that are resident on the nodes 232. In one embodiment, applications 305 are the same as applications 235 described with respect to FIG. 2.

Each node 232 also includes a server orchestration system agent 310 configured to track and collect information about the node 232 and to perform actions on the node 232. Thus, in one embodiment, using MCollective™ as the server orchestration system 226, the server orchestration system agent 310 can act as a MCollective™ server. The server orchestration system 226 would then act as the MCollective™ client that can send requests, queries, and commands to the MCollective™ server on node 232.

As previously mentioned, cartridges provide the underlying support software that implements the functionality of applications 305. In one embodiment, an application 305 may utilize one or more cartridge instances 330 that are run in one or more resource-constrained containers 325 on nodes 232. Cartridge library 320 provides an OS 315-based location, outside of application containers 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge. Each cartridge instance may include a software repository 318 that provides the particular functionality of the cartridge instance 330. Although FIG. 3 depicts just one cartridge instance 330 with a repository 318, it should be appreciated that each cartridge instance 330 of FIG. 3 includes a repository 318, even if not shown.

A container 325 is a resource-constrained process space on the node 232 to execute functionality of an application. In some embodiments, a container 325 is established by the node 232 with resource boundaries, including a limit and/or designation of the amount of memory, amount of storage, and security types and/or labels to be applied to any functions executed by the container 325. In one embodiment, containers 325 may be established using the Linux Containers (LXC) virtualization method. In some embodiments, a container 325 may also be known as a gear. In some embodiments, cartridges instances 330 for an application 305 may execute in containers 325 dispersed over more than one node 232, as shown with application 2 illustrated in FIG. 3. In other embodiments, cartridge instances 330 for an application 305 may run in one or more containers 325 on the same node 232, as shown with application 1 in FIG. 3.

In one embodiment, the server orchestration system broker 226 includes a resource control module 350 that manages capacity and utilization of nodes 232 in the multi-tenant PaaS system. The resource control module 350 controls utilization of nodes within the multi-tenant PaaS system by migrating containers 325 between nodes 232 based on an active capacity metric of the nodes 232. In one embodiment, migration of a container 325 from a node 232 occurs when the active capacity metric of the node 232 exceeds a threshold active capacity.

In one embodiment, a variety of considerations may be made when selecting which containers 325 from a node 232 are to be migrated. For example, containers may be selected based on several methods including, but not limited to: random selection of containers to provide variance; a selection of containers that are consuming the most resources (e.g., based on analysis of container control group resource statistics); and analysis of containers for the fewest external dependencies (external dependencies might involve public IP addresses, other cartridges, other cluster members, or even external service connections).

The active capacity of node 232 may refer to the number of "active" containers 325 running on the node 232 divided by the total number of active containers 325 that can run on the node 232. An "active" container is one that is currently executing and consuming resources. In some embodiments, a node 232 may contain both active and idle containers 325. The idle containers 325 may be ones that have not been started yet by their owners or my have been stopped by their owners. In either case, an idle container 325 may be one that is not executing and consuming resources of the node 232. As a result, the active capacity of a node 232 is different than the actual capacity of the node 232.

In one embodiment, an increase in a node's active capacity metric beyond a threshold level may be triggered by the addition of one or more new containers 325 to a node 232. In other embodiments, a node's 232 active capacity metric may increases beyond its active capacity threshold when an influx of containers 325 hosted by the node change from an idle state to an active state.

Figure 4:
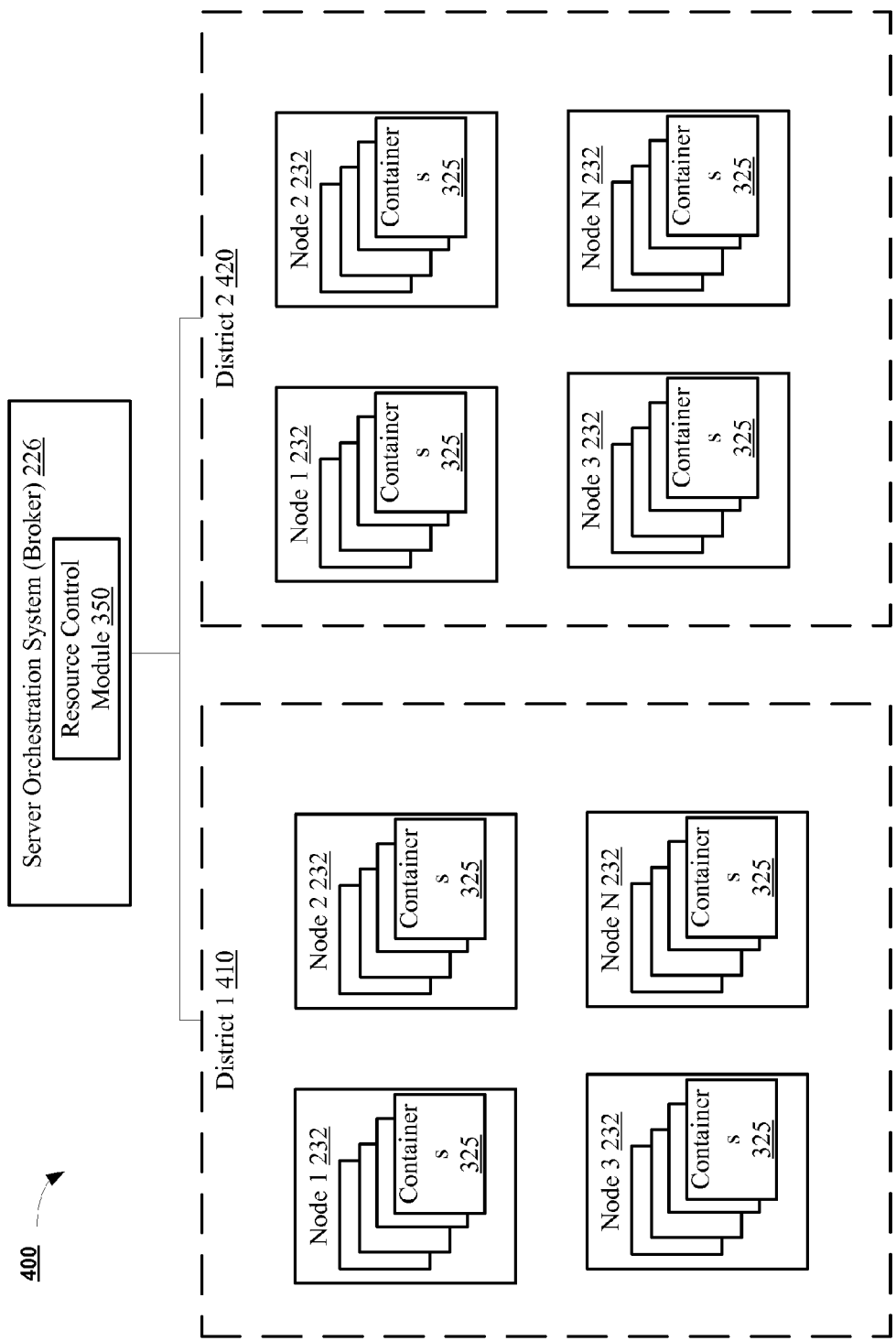
FIG. 4 is a block diagram depicting a multi-tenant PaaS system having a resource control module at the broker layer that implements capacity control measures according to an embodiment of the invention.

FIG. 4 is a block diagram depicting a multi-tenant PaaS system 400 having a resource control module 350 at the broker layer that implements utilization control measures according to an embodiment of the invention. In one embodiment, the resource control module 350 is the same as resource control module 350 described with respect to FIG. 3. The resource control module 350 maintains configuration data regarding the active and actual capacities, and their associated threshold levels, for each node 232 in a PaaS system. Each node 232 executes one or more containers 325. Nodes 232 and containers 325 correspond to their counterparts described in FIG. 3.

Nodes 232 are further grouped into districts 410, 420. Although only two districts 410, 420 are illustrated, one skilled in the art will appreciate that server orchestration system 226 may manage multiple (more than two) districts within a PaaS system. In one embodiment, a district 410, 420 is a collection of nodes 232 that is given a dedicated set of Internet Protocol (IP) addresses, ports, and security labels (such as SELinux™ security labels) to share. As such, two nodes 232 in the same district 410, 420 should not have any containers 325 that conflict with each other in terms of IP address, ports, or security labels.

Each district 410, 420 has a maximum total number of containers 325 that can be provisioned in the district 410, 420. For instance, if a district 410, 420 is provisioned with a set of SELinux™ security labels, then due to limitations of the SELinux™ security labeling system, only 6,000 unique security labels can be doled out before the security labels should be re-used. As such, in this embodiment, the district 410, 420 is limited to 6,000 containers 325 in order to avoid conflicts between containers 325 in a district 410, 420.

Due to the above-described configuration of nodes 232 within a district 410, 420, embodiments of the invention prioritize migration of container within a district over migration of containers to nodes 232 outside of their source district. When migrating a container 325 within a district 410, the container can maintain the district-assigned resources, such as the ports and security labels without regarding to the node 232 that the container 325 migrates to. However, if a container 325 is migrated outside of its source district 410, 420, then potential district-level resource conflicts can occur (e.g., conflicting security labels), which results in further processing for the migration.

Active and actual capacity metrics of each node 232 are based on the resource-usage limitations of each container 325. Each container 325 may be assigned a constrained set of node 232 resources (CPU, memory, disk I/O, network I/O) that the container 325 may utilize. Correspondingly, based on the assigned resource sets of the containers 325 in a node 232, the node is configured with a maximum active capacity and maximum actual (include idle and active container 325) capacity. In addition, the nodes 232 are configured with active capacity thresholds that determine when containers in the node 232 should be migrated.

The use of active capacity thresholds for a node 232 allows the node 232 to be over-utilized in terms of actual capacity (total number of containers 325 assigned to the node 232) under the assumption that many containers 325 on a node 232 are bound to be idle. Therefore, a node can be assigned more containers 325 than it can handle running at one time to better utilize resources of the node 232. The active capacity threshold is the protection mechanism that triggers a migration event to a new node 232 if the current active capacity on a node 232 increases to a level that is too high and puts too much load on the resources of the node 232. In one embodiment, an administrator of the multi-tenant PaaS system configures the capacity and threshold settings (both actual and active) of the districts 410, 420 and nodes 232, and these settings are then monitored and maintained by the resource control module 350 at the broker layer 226 of the PaaS system.

In one embodiment, an analysis of the active capacity metric, which in turn leads to migration of containers 325, may be triggered when an application (and thus, containers 325 for the application) is added to the district 410, 420. In other embodiments, a load balancing operation may trigger analysis of active capacity metrics to determine candidate nodes 232 for the migration process. In another embodiment, the resource control module 350 is programmed to perform status checks of the nodes 232 in the PaaS system at predetermined intervals (e.g., every 2-3 hours). In other embodiments, containers 325 may be migrated based on other reasons, such as system management When performing an active capacity metric analysis, the resource control module 350 pings nodes 232 for their active capacity metric, and based on this data determines whether any nodes 232 are at or near their active capacity threshold. If the active capacity metric analysis identifies nodes 232 that pass the active capacity threshold, then the resource control module identifies another node 232 in the same district 410, 420 having the lowest active capacity metric. One or more containers 325 on the identified node 232 are then migrated to the other node with the low active capacity metric.

The actual migration process involves temporarily stopping operations of the application associated with the container 325 being migrated, taking a snapshot of the container 325 in its paused state, copying the snapshot files to the container 325 location at the target node 232 receiving the migrated container 325, bringing up the container 325 at the target node 232, and removing files from the old source location of the container 325. Because of the nature of the container 325 being migrated, in particular that there is no shared file system underneath the container 325 on the node, the migration process can be somewhat seamless. The cartridges that a container 325 relies on stay at the node 232, but an exact copy of the relied on cartridges will exist at the source node 232, allowing the interlinked associations between migrated container and cartridges to persist once the container 325 is migrated to a new node 232.

In addition, as mentioned previously, due to the district 410, 420 configuration of nodes 232, a container 325 migrated within a district 410, 420 does not have to change its internal IP address(es), ports or security labeling. However, an external Domain Name Service (DNS) parameter of the container 325 is updated as part of the migration process, as that is tied to the hosting node 232 of the cartridge 325.

Figure 5:
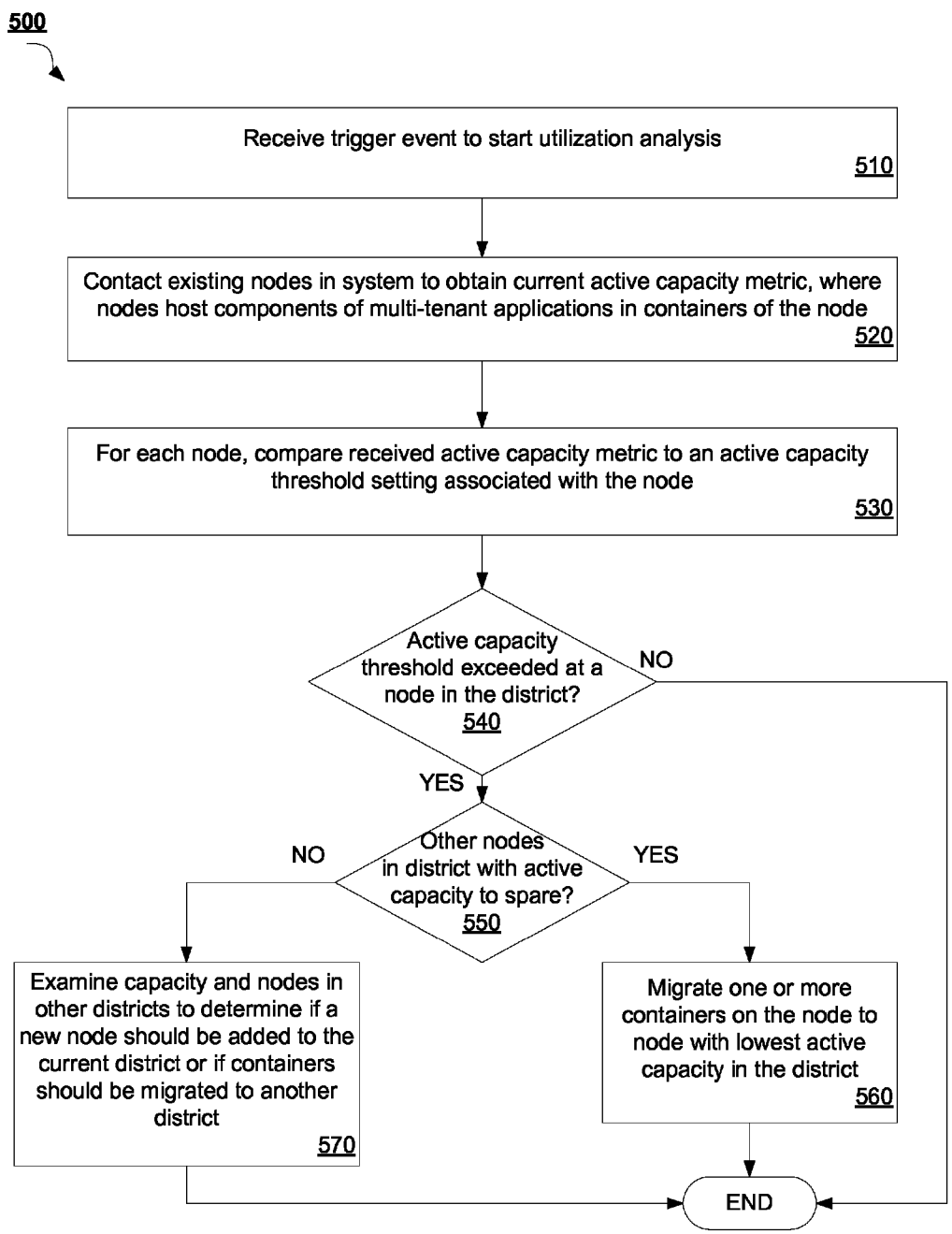
FIG. 5 is a flow diagram illustrating a method for performing an analysis to determine whether a container is to be migrated to another node to control utilization in a multi-tenant PaaS system according to an embodiment of the invention.

FIG. 5 is a flow diagram illustrating a method 500 for performing an analysis to determine whether a container is to be migrated to another node to control utilization in a multi-tenant PaaS system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a resource control module executing on a computing device, such as resource control module 350 described with respect to FIGS. 3 and 4.

Method 500 begins at block 510 where a trigger event is received that starts a utilization analysis process. In one embodiment, the trigger event is the instantiation of a new application in the multi-tenant PaaS system. In another embodiment, the trigger event is a periodic status check of the nodes and district in the multi-tenant PaaS system.

At block 520, the existing nodes in the PaaS system are contacted (pinged) to obtain their current active capacity metric. In one embodiment, the active capacity metric refers to the number of "active" containers running on a node divided by the total number of active containers that can run on the node. An "active" container is one that is currently executing and consuming resources. The resource control module dictates what the maximum number of active containers on the node can be, while the node itself provides the information about the current number of active containers. In one embodiment, the node maintains the active capacity metric (current active container/total active containers allowed). In other embodiment, the node may provide the number of active containers, and the resource control module may calculate the active capacity metric by dividing the provided number by data stored at the resource control module indicating the maximum total number of active containers allowed at the node.

At block 530, the received active capacity metric is compared to an active capacity threshold associated with the node and stored by the resource control module. For example, assume a node has a maximum actual capacity of 200 containers, a maximum active capacity of 100 containers, and an active capacity threshold of 90%. Currently the same node has 150 containers instantiated on the node with 80 of those containers currently active and 70 of the containers idle. In this case the active capacity of the node is 80% (80 active containers/100 maximum active containers allowed) and does not exceed the 90% active capacity threshold set for the node. If an influx of idle containers became active, say 30 containers, then the active capacity metric would increase to 110% and would exceed the active capacity threshold.

Then, at decision block 540, it is determined whether an active capacity threshold is exceeded at any node within the district. If not, the method 500 ends. However, if the active capacity threshold is exceeded by one or more nodes in the district, then method 500 continues to decision block 550, where it is determined whether there are other nodes in the district with active capacity to spare. If the other nodes within the district with spare active capacity are identified, then method 500 proceeds to block 570 where one or more containers on the node exceeding active capacity threshold are migrated to the node in the district with the lowest active capacity metric.

On the other hand, if no other nodes with active capacity to spare are identified, then method 500 proceeds to block 570. At block 570, the container capacity of the district is examined to determine if a new node should be added to the district to migrate one or more containers. In addition, the active capacity of nodes within other districts is examined to determine if the one or more containers should be migrated to another district. The resource control module may make a decision based on administrative configuration settings which course of action should be taken for migrating the containers.

Figure 6:
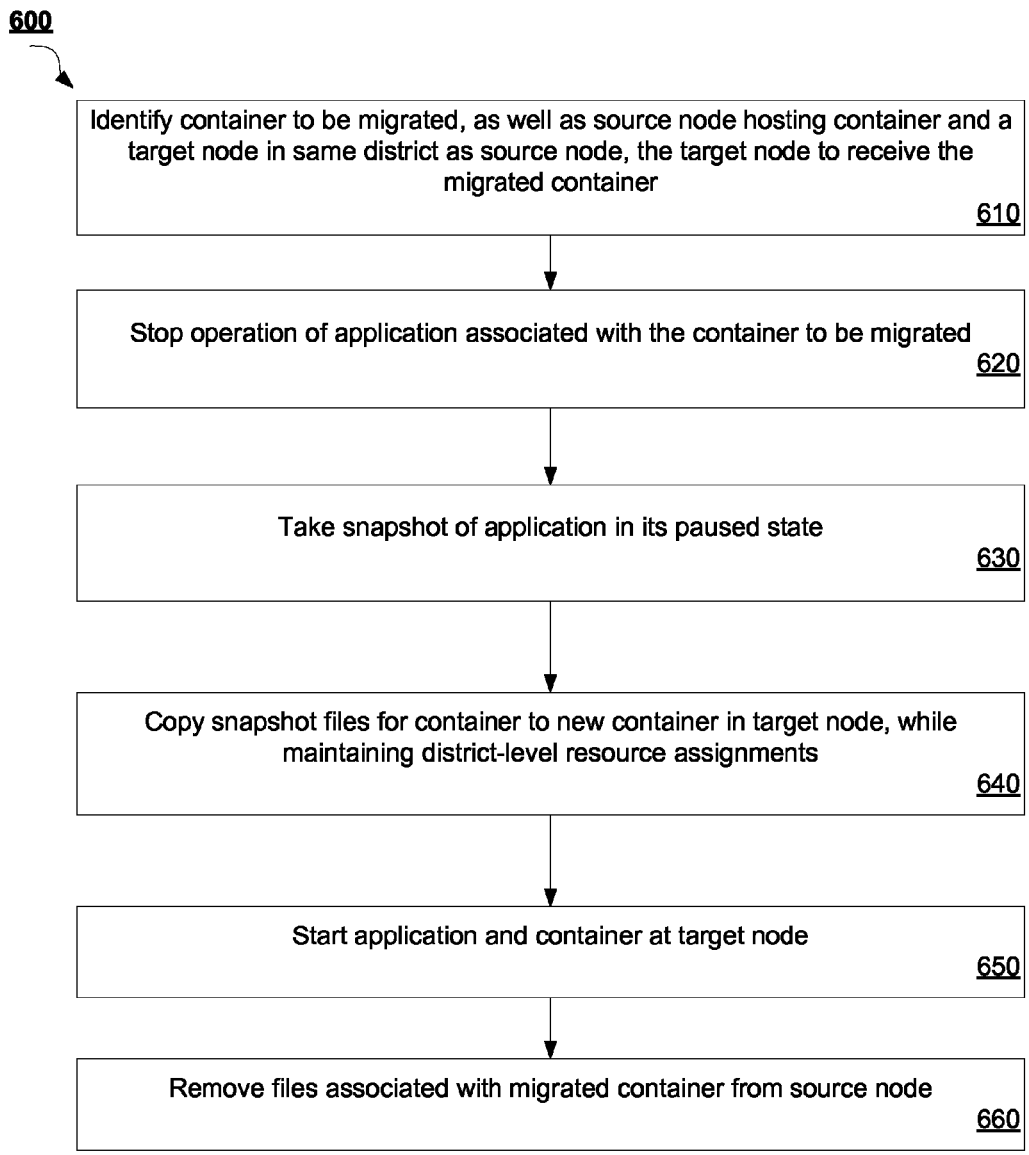
FIG. 6 is a flow diagram illustrating a method for performing migration of containers between nodes in a PaaS system according to an embodiment of the invention.

FIG. 6 is a flow diagram illustrating a method 600 for performing migration of containers between nodes in a PaaS system according to an embodiment of the invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by a resource control module executing on a computing device, such as resource control module 350 described with respect to FIGS. 3 and 4.

Method 600 begins at block 610 where a container is identified to be migrated. As part of the identification of the container, a source node hosting the container is identified and a target node to receive the container is identified. In one embodiment, the source node and the target node are located in the same district. At block 620, operations of the application associated with the container are stopped. Then, at block 630, a snapshot of the application in its paused state is taken.

At block 640, the snapshot files are copied to a new container in the target node. Because there is no shared file system underneath the container on the node, the cartridges that a container relies on stay at the source node, but an exact copy of the relied-on cartridges exist at the source node, thereby allowing the interlinked associations between migrated container and cartridges to persist once the container is migrated to a new node. In addition, due to the district configuration of nodes, the container does not have to change its internal IP address, ports, or security labeling (district-level resources). However, an external DNS parameter of the container is updated as part of the migration process.

At block 650, the application is started which includes starting the container at the target node. Lastly, at block 660, any files associated with the migrated container that are still located on the source node are removed.

Figure 7:
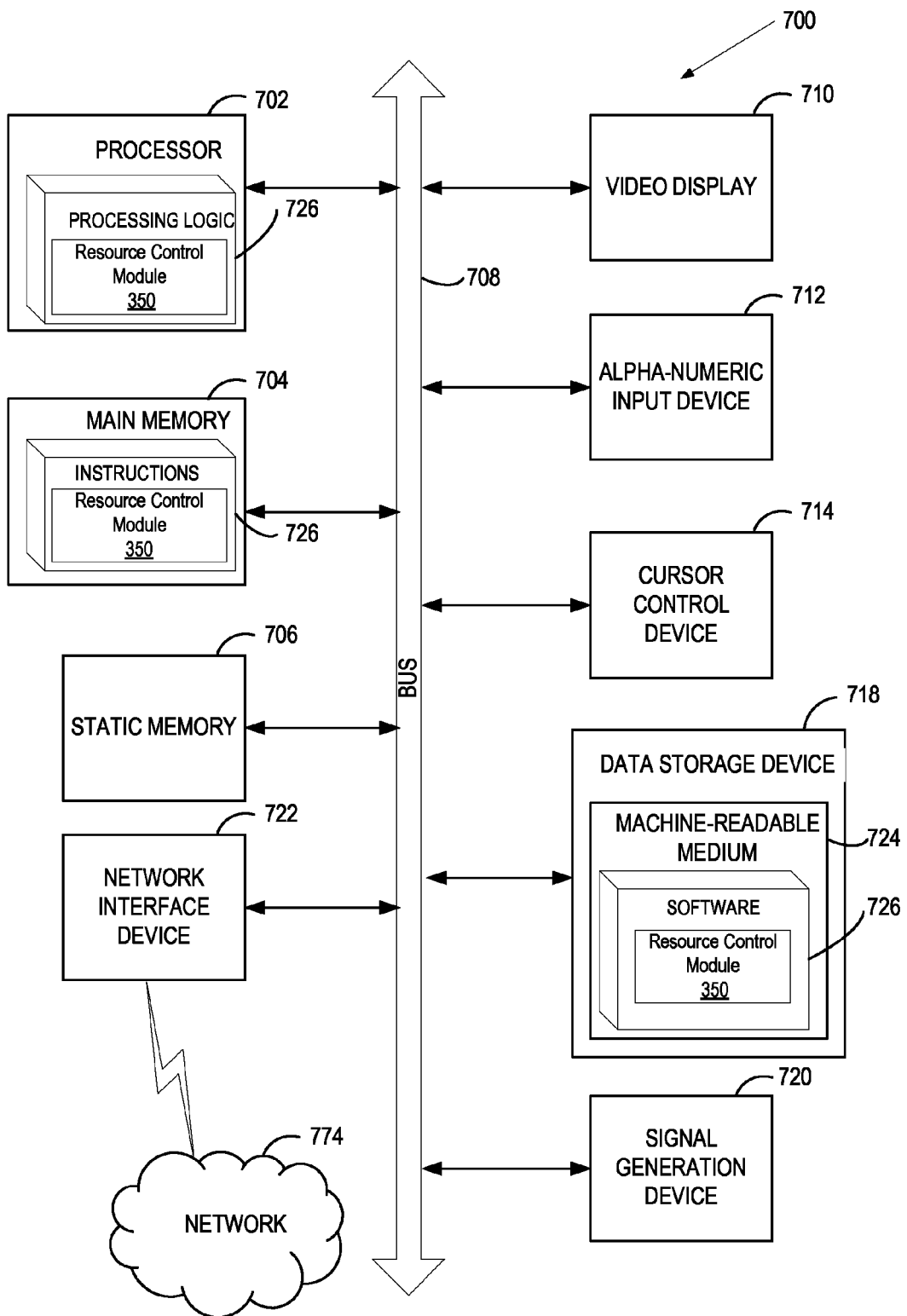
FIG. 7 illustrates a block diagram of one embodiment of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein, illustrated in FIG. 7 by depicting instructions 726 within processor 702.

The computer system 700 may further include a network interface device 722. The computer system 700 also may include a video display unit 710 (e.g., a liquid crystal display (LCD), a cathode ray tube (CRT), or a touchscreen), an alphanumeric input device 712 (e.g., a keyboard), a cursor control device 714 (e.g., a mouse), and a signal generation device 720 (e.g., a speaker).

The data storage device 718 may include a machine-readable storage medium 724 (also known as a computer-readable storage medium) on which is stored software 726 (e.g., one or more sets of instructions, software, etc.) embodying any one or more of the methodologies or functions described herein. The software 726 may also reside, completely or at least partially, within the main memory 704 (e.g., instructions 726) and/or within the processor 702 (e.g., processing logic 726) during execution thereof by the computer system 700, the main memory 704 and the processor 702 also constituting machine-readable storage media. The software 726 may further be transmitted or received over a network 774 via the network interface device 722.

In one embodiment, the software 726 include instructions for a resource control module 350, which may correspond to resource control module 350 of FIG. 3, and/or a software library containing methods that call the resource control module for controlling utilization in a multi-tenant PaaS environment in a cloud computing system. While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

obtaining, by a resource control module executed by a processing device, an active capacity metric of each virtual machine (VM) of a plurality of VMs in a district of a multi-tenant Platform-as-a-Service (PaaS) system, the active capacity metric comprising a result of dividing a number of containers that are currently executing in the VM by a maximum number of active containers allowed to execute in the VM;

determining, by the resource control module, that the active capacity metric of a source VM in the district exceeds an active capacity threshold associated with the source VM; and migrating at least one of the containers of the source VM to a target VM in the district, wherein the target VM is operating with an active capacity metric below the active capacity threshold associated with the target VM, wherein each of the containers comprise a resource-constrained process space to execute functionality of an application of a plurality of applications having different owners, and wherein the containers execute one or more cartridge instances representing a form of support software providing the functionality needed to run each of the plurality of applications.

2. The method of claim 1, wherein the active capacity metric does not take into account the containers of the source VM that are idle.

3. The method of claim 1, further comprising detecting an occurrence of a trigger event for capacity analysis of the plurality of VMs, wherein the trigger event comprises at least one of instantiation of a new application in the multi-tenant PaaS system or a status check performed by the resource control module at periodic intervals.

4. The method of claim 1, wherein when no VM of the plurality of VMs in the district has an active capacity metric below the active capacity threshold associated with the corresponding VM, examining an maximum actual capacity of the containers associated with the district to determine if a new VM should be added to the district in order to migrate the at least one of the containers.

5. The method of claim 1, wherein migrating the at least one of the containers further comprises:

stopping operations of an application associated with the at least one of the containers;

taking a snapshot of the at least one of the containers;

copying the snapshot files to the target VM;

starting the application and the at least one of the containers on the target VM; and removing files associated with the at least one of containers at the source VM.

6. The method of claim 5, wherein copying the snapshot files further comprises maintaining district-level resource assignments of the at least one of the containers.

7. The method of claim 1, wherein the district comprises a collection of the plurality of VMs that is given a dedicated set of Internet Protocol (IP) addresses, ports, and security labels to share when executing the containers within the plurality of VMs of the district.

8. The method of claim 1, wherein the resource control module operates on a broker layer of the multi-tenant Platform-as-a-Service (PaaS) system, and wherein the multi-tenant PaaS system implemented in a cloud computing system.

9. A system, comprising:

a memory;

a processing device communicably coupled to the memory; and a resource control module executable from the memory by the processing device, the resource control module to:

obtain an active capacity metric of each virtual machine (VM) of a plurality of VMs in a district of a multi-tenant Platform-as-a-Service (PaaS) system, the active capacity metric comprising a result of dividing a number of containers that are currently executing in the VM by a maximum number of active containers allowed to execute in the VM;

determine that the active capacity metric of a source VM in the district exceeds an active capacity threshold associated with the source VM; and migrate at least one of the containers of the source VM to a target VM in the district, wherein the target VM is operating with an active capacity metric below the active capacity threshold associated with the target VM, wherein each of the containers comprise a resource-constrained process space to execute functionality of an application of a plurality of applications having different owners, and wherein the containers execute one or more cartridge instances representing a form of support software providing the functionality needed to run each of the plurality of applications.

10. The system of claim 9, wherein when no VM of the plurality of VMs in the district has an active capacity metric below the active capacity threshold associated with the corresponding VM, examining an maximum actual capacity of the containers associated with the district to determine if a new VM should be added to the district in order to migrate the at least one of the containers.

11. The system of claim 9, wherein the resource control module to migrate the one or more containers further comprises the resource control module to:

stop operations of an application associated with the at least one of the containers;

take a snapshot of the at least one of the containers;

copy the snapshot files to the target VM;

start the application and the at least one of the containers on the target VM; and remove files associated with the at least one of containers at the source VM.

12. The system of claim 9, wherein the district comprises a collection of the plurality of VMs that is given a dedicated set of Internet Protocol (IP) addresses, ports, and security labels to share when executing the containers within the plurality of VMs of the district.

13. The system of claim 9, wherein the resource control module operates on a broker layer of the multi-tenant PaaS system, and wherein the multi-tenant PaaS system implemented in a cloud computing system.

14. A non-transitory machine-readable storage medium including instructions that, when accessed by a processing device, cause the processing device to perform operations comprising:

obtaining, by a resource control module executed by the processing device, an active capacity metric of each virtual machine (VM) of a plurality of VMs in a district of a multi-tenant Platform-as-a-Service (PaaS) system, the active capacity metric comprising a result of dividing a number of containers that are currently executing in the VM by a maximum number of active containers allowed to execute in the VM;

determining, by the resource control module, that the active capacity metric of a source VM in the district exceeds an active capacity threshold associated with the source VM; and migrating at least one of the containers of the source VM to a target VM in the district, wherein the target VM is operating with an active capacity metric below the active capacity threshold associated with the target VM, wherein each of the containers comprise a resource-constrained process space to execute functionality of an application of a plurality of applications having different owners, and wherein the containers execute one or more cartridge instances representing a form of support software providing the functionality needed to run each of the plurality of applications.

15. The non-transitory machine-readable storage medium of claim 14, wherein when no VM of the plurality of VMs in the district has an active capacity metric below the active capacity threshold associated with the corresponding VM, examining an maximum actual capacity of the containers associated with the district to determine if a new VM should be added to the district in order to migrate the at least one of the containers.

16. The non-transitory machine-readable storage medium of claim 14, wherein migrating the one or more containers further comprises:
 stopping operations of an application associated with the at least one of the containers;
 taking a snapshot of the at least one of the containers;
 copying the snapshot files to the target VM;
 starting the application and the at least one of the containers on the target VM; and
 removing files associated with the at least one of containers at the source VM.

17. The non-transitory machine-readable storage medium of claim 14, wherein the district comprises a collection of the plurality of VMs that is given a dedicated set of Internet Protocol (IP) addresses, ports, and security labels to share when executing the containers within the plurality of VMs of the district.

* * * * *